(12) United States Patent
Tiry

(10) Patent No.: US 10,836,243 B2
(45) Date of Patent: *Nov. 17, 2020

(54) REMOTE LOCATED CLUTCH

(71) Applicant: Arctic Cat, Inc., St. Cloud, MN (US)

(72) Inventor: Michael J. Tiry, Madison, WI (US)

(73) Assignee: ARCTIC CAT, INC., St. Cloud, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/711,092

(22) Filed: Dec. 11, 2019

(65) Prior Publication Data
US 2020/0114748 A1 Apr. 16, 2020

Related U.S. Application Data

(63) Continuation of application No. 15/420,925, filed on Jan. 31, 2017, now Pat. No. 10,532,645, which is a
(Continued)

(51) Int. Cl.
B60K 5/04 (2006.01)
B60K 17/08 (2006.01)
(Continued)

(52) U.S. Cl.
CPC .............. B60K 5/04 (2013.01); B60K 17/02 (2013.01); B60K 17/08 (2013.01); B60K 17/22 (2013.01);
(Continued)

(58) Field of Classification Search
CPC .... B60K 5/04; B60K 2005/003; B60K 17/02; B60K 17/04; B60K 17/08; B60K 17/28; B62K 5/01
See application file for complete search history.

(56) References Cited

U.S. PATENT DOCUMENTS 4,193,322 A 3/1980 Morino et al.
4,714,126 A * 12/1987 Shinozaki .............. B60K 17/34
180/233
(Continued)

FOREIGN PATENT DOCUMENTS

EP 0897074 A2 2/1999
EP 1355089 A2 10/2003
JP 2009-090931 4/2009

OTHER PUBLICATIONS

Manoj et al., "Wet Clutch Modeling Techniques; Design Optimization of Clutches in an Automatic Transmission", Master's Thesis in the Automotive Engineering, Published 2013, 56 Pages, Sweden.

Primary Examiner — Frank B Vanaman
(74) Attorney, Agent, or Firm — Lowe Graham Jones PLLC

(57) ABSTRACT

A drive package includes a remote located CVT and a motor where the CVT is positioned rearward (or forward) of the motor. An auxiliary drive mechanism couples a drive shaft of the CVT to a crankshaft of the motor. The auxiliary drive mechanism is a belt or chain. The drive shaft is substantially parallel to, and longitudinally offset from, the crankshaft. Thus, the width of the drive package is reduced as compared to ATVs having a CVT located adjacent the motor. A method of making an ATV with the drive package is provided.

19 Claims, 3 Drawing Sheets

Related U.S. Application Data continuation of application No. 14/245,901, filed on Apr. 4, 2014, now Pat. No. 9,592,725.

(51) Int. Cl.

| | | |
|---|---|---|
| *B60K 17/22* | (2006.01) | |
| *B62K 5/01* | (2013.01) | |
| *B60K 17/02* | (2006.01) | |
| *B60K 17/28* | (2006.01) | |
| *B60K 17/344* | (2006.01) | |

(52) U.S. Cl.
CPC ............ *B60K 17/28* (2013.01); *B60K 17/344* (2013.01); *B62K 5/01* (2013.01); *B60Y 2200/124* (2013.01); *B60Y 2400/72* (2013.01); *Y10T 29/49826* (2015.01)

(56) References Cited

U.S. PATENT DOCUMENTS

| | | |
|---|---|---|
| 4,938,098 A | 7/1990 | Sasaki et al. |
| 5,152,361 A | 10/1992 | Hasegawa et al. |
| 5,406,154 A | 4/1995 | Kawaguchi et al. |
| 5,915,495 A | 6/1999 | Kerlin et al. |
| 6,076,624 A | 6/2000 | Izumi et al. |
| 6,149,540 A | 11/2000 | Johnson et al. |
| 6,405,823 B1 | 6/2002 | Fukamachi et al. |
| 6,758,299 B2 * | 7/2004 | Ito ..................... F02B 61/02 123/193.1 |
| 7,398,753 B2 | 7/2008 | Masuda et al. |
| 7,549,676 B2 * | 6/2009 | Uchiyama ............. B62K 5/01 180/291 |
| 7,610,987 B2 | 11/2009 | Aoyama |
| 7,882,917 B2 | 2/2011 | Inomori et al. |
| 8,002,653 B2 | 8/2011 | Shiozaki et al. |
| 8,167,108 B2 | 5/2012 | Nogi |
| 8,235,160 B2 | 8/2012 | Ogasawara et al. |
| 2001/0047901 A1 | 12/2001 | Tsutsumikoshi |
| 2002/0033295 A1 | 3/2002 | Korenjak et al. |
| 2003/0010561 A1 | 1/2003 | Bartel |
| 2004/0124029 A1 | 7/2004 | Takenaka et al. |
| 2005/0126842 A1 | 6/2005 | Rasidesdu et al. |
| 2005/0173177 A1 * | 8/2005 | Smith ................ B60K 17/354 180/233 |
| 2005/0173180 A1 * | 8/2005 | Hypes ................ B60K 17/16 180/292 |
| 2008/0161142 A1 | 7/2008 | Shiozaki et al. |
| 2008/0268992 A1 | 10/2008 | Mitsubori et al. |
| 2008/0283326 A1 * | 11/2008 | Bennett ................ B60B 3/142 180/246 |
| 2010/0275713 A1 | 11/2010 | Penttila et al. |
| 2012/0035018 A1 | 2/2012 | Choi |
| 2012/0055728 A1 | 3/2012 | Bessho et al. |

\* cited by examiner

REMOTE LOCATED CLUTCH

PRIORITY CLAIM

The present application is a continuation of U.S. patent application Ser. No. 15/420,925, entitled REMOTE LOCATED CLUTCH, filed Jan. 31, 2017, which is a continuation of U.S. patent application Ser. No. 14/245,901, entitled REMOTE LOCATED CLUTCH, filed Apr. 4, 2014, and issued as U.S. Pat. No. 9,592,725 on Mar. 14, 2017 the content of which is hereby incorporated by reference.

FIELD OF INVENTION

The present invention relates to a drive package for vehicles, and more particularly, to a drive package with a remote located continuously variable transmission (CVT) for an all-terrain vehicle.

BACKGROUND OF THE INVENTION

Vehicles, particularly straddle-type all-terrain vehicles (ATVs), have limited area to house the drive components of the vehicle, such as a motor and a transmission. Presently, most all-terrain vehicles have a CVT with a drive clutch positioned laterally of the motor. The crankshaft of the motor extends to or is coupled to the drive clutch of the CVT, such that the drive clutch is laterally adjacent (typically to the left or right) of the motor. This configuration consumes a certain width below an operator riding area, such as the foot-wells (or seat) of the vehicle, because the motor and the CVT are positioned primarily below the riding area upon which a rider sits. The result is that the foot-wells of the vehicle are spaced apart by the certain distance dictated by of the drive clutch of the CVT being adjacent the motor. It is advantageous to reduce the width of the drive package, in part, because the distance between the foot-wells, and the resulting vehicle width, are important design factors considering the various sizes of riders, ergonomic factors, and the width regulations that apply to certain all-terrain vehicles.

SUMMARY OF THE INVENTION

The present invention overcomes the disadvantages of the prior-art drive systems by providing an all-terrain vehicle with a remote-located CVT positioned rearward (or forward) of a motor. An auxiliary drive mechanism (e.g., a belt) couples the CVT to the motor. As such, the drive package width is reduced, and therefore, the foot-wells of the vehicle are closer together as compared to a comparable ATV with a drive clutch driven directly by the crankshaft.

In a preferred embodiment, an ATV includes a front pair of ground engaging members (e.g., wheels) and a rear pair of ground engaging members (at least one pair for moving the vehicle). Naturally, the ATV includes a motor having a crankshaft for transferring rotational power to a transmission for rotation of the ground engaging members. Here, the vehicle includes a CVT with a drive clutch shaft rotatably coupled to the crankshaft and positioned either rearward or forward of the crankshaft. In either configuration, the drive clutch shaft is preferably substantially parallel to, and longitudinally and/or vertically offset from, the crankshaft. In the preferred embodiment, the drive clutch shaft is positioned rearward the crankshaft (FIGS. 1 and 2). An auxiliary drive mechanism rotatably couples the drive clutch shaft to the crankshaft. The auxiliary drive mechanism may be one of a belt, chain, or shaft, but preferably a belt. Because the auxiliary drive mechanism can be a relatively thin belt, for example, the drive package width is reduced because the CVT is positioned rearward the motor (FIG. 2), as opposed to on one side of the motor as with many existing ATVs.

As with many CVTs, the drive clutch is attached to a driven clutch by a CVT belt. The driven clutch is coupled to an output member and a gearbox system for rotating one or both of the front pair and the rear pair of ground engaging members. Typically, the gearbox system would be a transaxle for rotation of a rear axle coupled to the rear pair of ground engaging members (FIG. 2).

In some embodiments, the ATV includes a secondary drive mechanism rotatably coupled to one of the crankshaft and the drive clutch shaft for providing motive power to at least one auxiliary device attachable to the ATV. In some embodiments, a stator is secured to the side of the motor at the end of the crankshaft on an opposing side of the motor from the auxiliary drive mechanism to provide electrical energy from the rotation of the crankshaft. Alternatively, the stator assembly can be attached to the drive clutch shaft (which is in continuous rotation with the crank shaft) to further reduce the width of the entire drive package.

In some embodiments, a centrifugal clutch may be attached to one of the crankshaft and the drive clutch shaft. As such, the centrifugal clutch provides engagement of either the crankshaft or the drive clutch shaft (as the case may be) as revolutions per minute exceed a certain threshold.

A method is provided for making a drive package for an ATV having a front pair and a rear pair of ground engaging members. The method includes, in any particular suitable order, attaching a motor having a crankshaft to the vehicle and coupling an auxiliary drive mechanism (e.g., a belt) to the crankshaft, so that the auxiliary drive mechanism is rotatably drivable by the crankshaft. The method further includes positioning a drive shaft of a CVT rearward of the crankshaft, and coupling the auxiliary drive mechanism to the drive shaft. Accordingly, rotation of the crankshaft causes movement of the auxiliary drive mechanism, thereby causing rotation of the drive shaft to move one or both of the front pair or rear pair ground engaging members.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
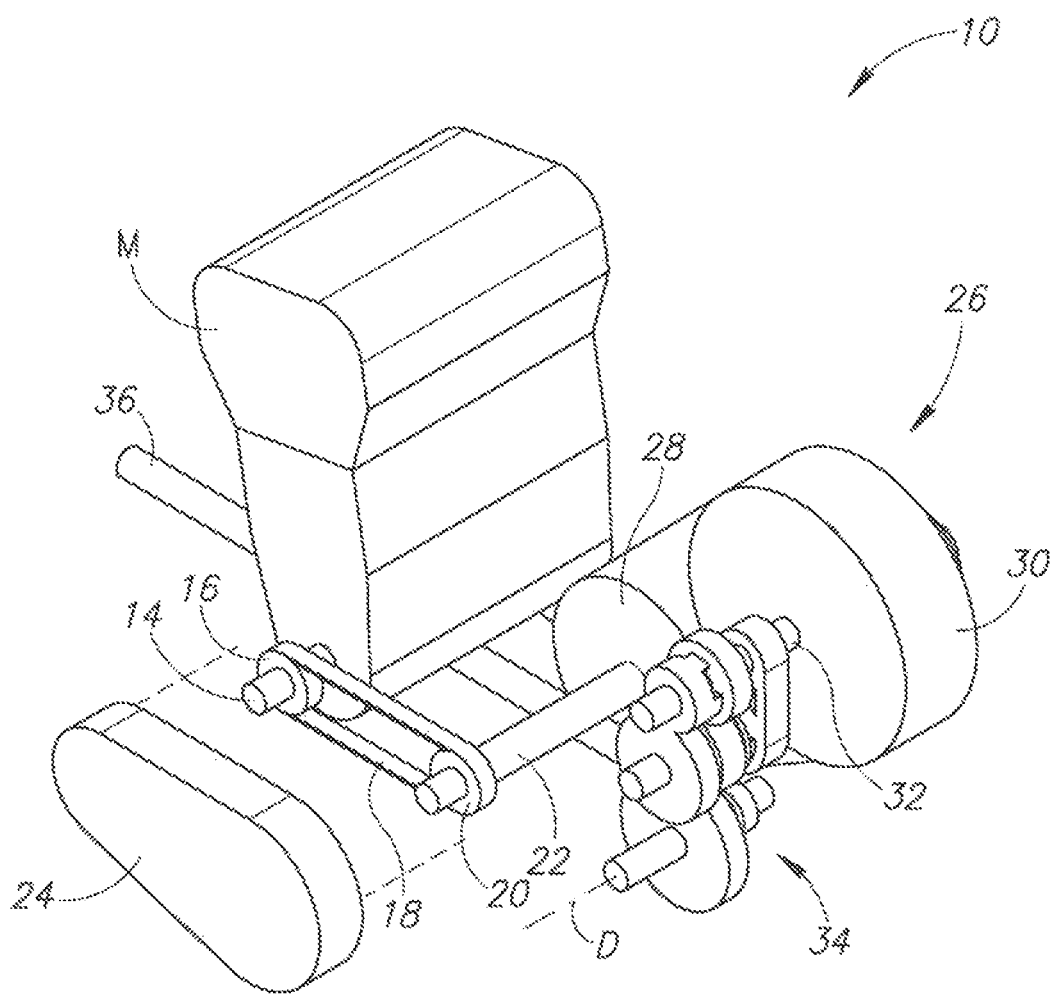
FIG. 1 is an isometric view of a drive package of the present invention.

FIG. 1 shows a drive package 10 for an ATV 12 (FIGS. 2 and 3) in a preferred embodiment. The drive package 10 includes a motor M having a crankshaft 14, in a similar manner to many motors and crankshafts on ATVs. Attached to the crankshaft 14 is a first pulley or gear 16. Rotatably coupled to the first gear 16 is an auxiliary drive mechanism 18, such as a belt or chain, extending from a lateral end of the crankshaft 14. A second pulley or gear 20 is also rotatably coupled to the auxiliary drive mechanism 18. Attached to the second gear 20 is a drive shaft 22, such as a drive clutch shaft. The first gear 16, the second gear 20, and the auxiliary drive mechanism 18 may be covered by a housing 24. As the motor M rotates the crankshaft 14 and the gear 16 rotate in a counter-clockwise direction, for example, as the auxiliary drive mechanism 18 is translated and thereby rotates the gear 20 and drive shaft 22 in the same direction.

Figure 2:
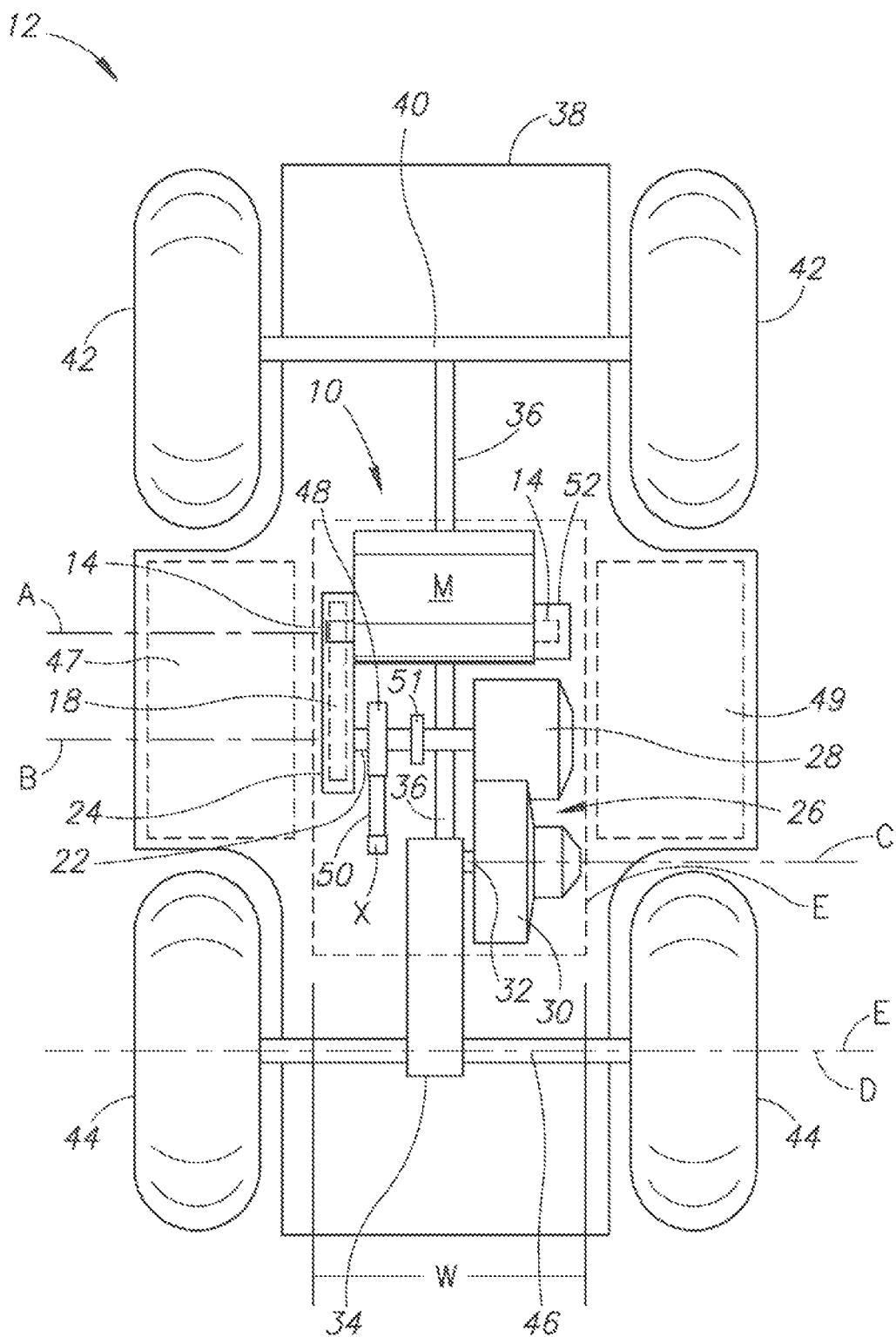
FIG. 2 is a top view of an ATV with the drive package of FIG. 1.
Figure 3:
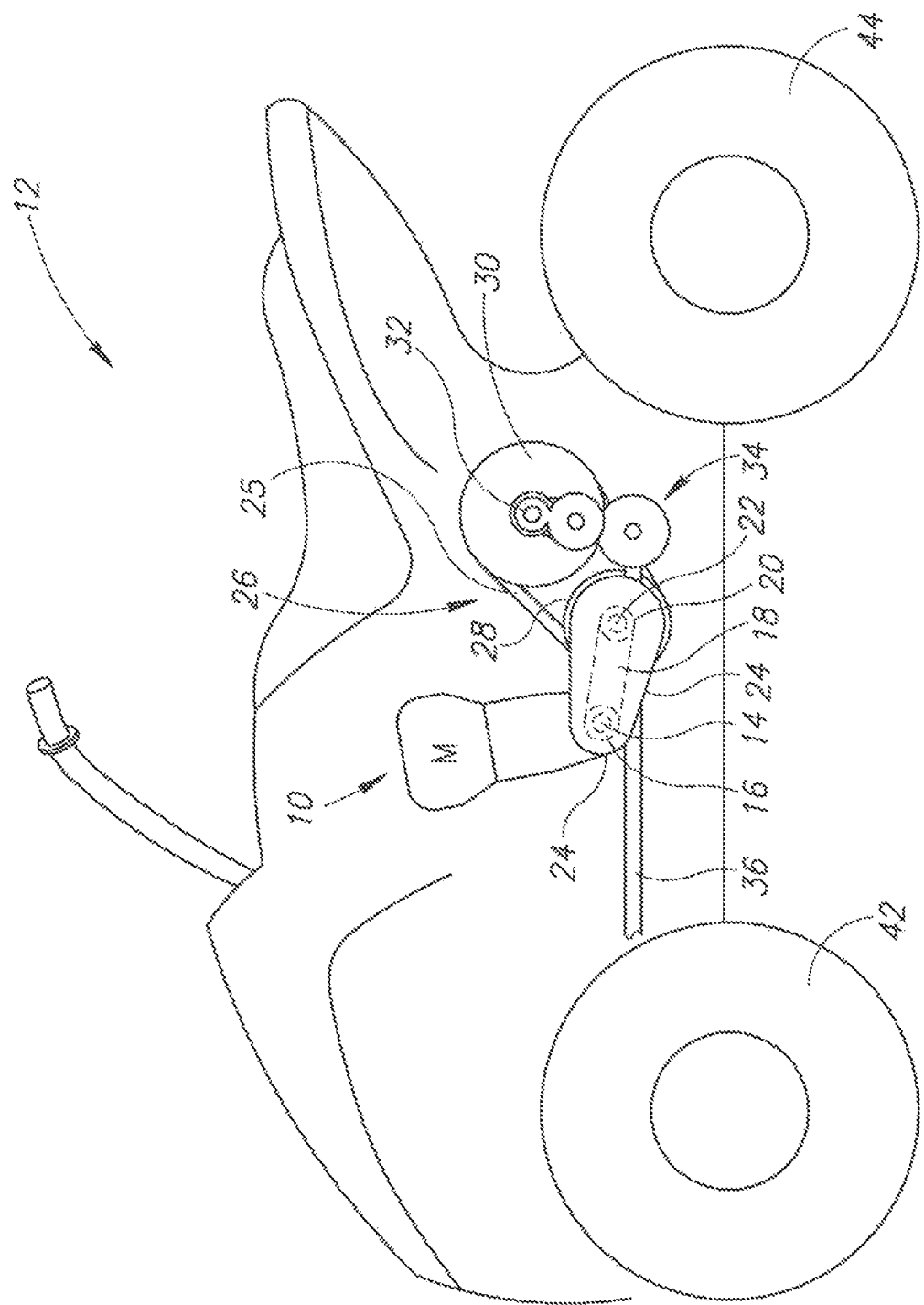
FIG. 3 is a left side view of the ATV of FIG. 2.

The drive shaft 22 is drivingly engaged to a CVT 26. The CVT 26 includes a drive clutch 28 attached to the drive shaft 22. The drive clutch 28 is rotatably coupled to a driven clutch 30 by a CVT belt 25 (FIG. 3). A driven shaft 32 is attached to the driven clutch 30 and coupled to a set of gears 34 (or a gearbox 34; FIG. 2) for transferring rotational energy to a rear axle and to a front drive member 36, which is coupleable to a front pair of wheels (FIG. 2). In operation, as the drive shaft 22 is rotated by the crankshaft 14 via the auxiliary drive mechanism 18, the drive clutch 28 rotates the CVT belt 25 that rotates the driven clutch 30, and consequently rotates the driven shaft 32. The driven shaft 32 may cause rotation of either or both of a front axle or rear axle of a vehicle (e.g., the vehicle of FIG. 2).

Of importance, the CVT 26 is positioned rearward of the motor M and crankshaft 14, in the preferred embodiment. The CVT 26 is coupled to the motor M by the auxiliary drive mechanism 18. Because the auxiliary drive mechanism does not include the relatively wide clutches of a CVT, the drive package width (or envelope width) of the package 10 is reduced as compared to existing packages where the drive clutch is immediately adjacent the left side of the motor. The result is a drive package that has a noticeably reduced width as compared to existing package configurations.

FIG. 2 is a top view of the vehicle 12 having mounted thereto the drive package 10 described with reference to FIG. 1. The vehicle 12 includes a frame 38 (schematically shown), a front axle 40, and a front pair of ground engaging members 42 (e.g., wheels in this example). A rear axle 46 is also coupled to the frame 38 and is coupled to a rear pair of ground engaging members 44. From this view, it will be appreciated that the drive clutch shaft 22 is longitudinally offset from the crankshaft 14. Thus, the crankshaft 14 has a longitudinal axis A that is substantially parallel to, and spatially forward of, a longitudinal axis B of the drive shaft 22. Thus, the crankshaft 14 is oriented transverse to a longitudinal axis of the vehicle. This provides the advantage of providing a predefined envelope E with a predefined width W because the drive clutch 28 is not positioned laterally adjacent the motor M and crankshaft 14, as with existing systems. Here, the drive clutch 28 is rearward the motor M in the preferred embodiment while the crankshaft still exits the side of the engine for transfer of rotational power. Alternatively, the drive clutch 28 and CVT 26 may be positioned forward of the motor M. In some embodiments, depending upon the type of motor used, width W is between 16 inches and 23 inches. In a preferred embodiment, width W is 16 inches or less. One preferred example, with a single cylinder engine, width W is preferably 21.5 inches, or less in some configurations. Using a parallel twin cylinder engine, width W is preferably 23 inches, or less in some configurations.

As discussed with reference to FIG. 1, the driven clutch 30 rotates the driven shaft 32, which is coupled to the gearbox 34. In a preferred embodiment, the gearbox 34 is a transaxle coupled to the rear axle 46 (gearbox 34 is longitudinally exaggerated in FIG. 2 for purposes of illustrating the configuration of the CVT rearward the motor). A half shaft of the rear axle will typically extend from each side of the gearbox 34 to the right and left wheels. As will be appreciated from FIG. 2, each power transfer linkage from the crankshaft 14, to the drive shaft 22, to the driven shaft 32, to the rear axle 46, are each zero degree power transfer linkages relative to each other. Thus, the crankshaft 14, drive shaft 22, driven shaft 32, gears of gearbox 34 (FIG. 1), and rear axle 46 each have an axis of rotation substantially parallel to each other (respectively labeled A, B, C, D, and E). Such configuration is advantageous because it improves the engine efficiency by minimizing energy losses due to zero-degree power transfer linkages from the crankshaft 14 all the way to the axle 46, for example.

A left foot-well 47 and a right foot-well 49 are disposed on either side of the predefined envelope E. Because the predefined width W is 21.5 inches or less, in a preferred embodiment, the foot-wells 47 and 49 are positionable closer together than with existing ATVs. Not only is such spacing ergonomically comfortable, the spare spacing provides room for other vehicle features, including reduced overall width.

In some embodiments, a supplemental gear 48 is attached to the drive shaft 22, and a secondary drive mechanism 50 is rotatably coupled to the supplemental gear 48 on drive shaft 22 for providing power to at least one auxiliary device X attachable to the vehicle 12. The at least one auxiliary device X may be one or more of a water pump, oil pump, compressor, or other device that requires power transfer from the crankshaft of the engine. Advantageously, attaching such devices to the drive clutch shaft (instead of the crankshaft) further reduces the overall width of the drive package. In some embodiments, a centrifugal clutch 51 is coupled to the drive shaft 22 and is actuated at a threshold rotational speed of the drive shaft 22. Of course, an upstream shaft and a downstream shaft (in the drive train sense) would be attached to either side of the centrifugal clutch 51, as with a typical centrifugal clutch configuration. In the configuration shown with the supplemental gear 48 upstream of the centrifugal clutch 51, during relatively low rpms (e.g., when the motor idles) the supplemental gear 48 is rotated but the centrifugal clutch 51 is not yet actuated. In other embodiments (not shown on the figures), the supplemental gear 48 can be positioned downstream the centrifugal clutch 51 such that the supplemental gear 48 is not rotated until the centrifugal clutch 51 engages as rotational speed reaches the threshold.

In some embodiments, a stator 52 is coupled to the crankshaft 14 on an opposing side on the motor M from the auxiliary drive mechanism 18. The stator 52 forms part of an alternator to produce electricity for vehicle functions such as for powering electrical devices of the ATV.

In some embodiments, the gearbox 34 is coupled to the axle 46 (typically two half shafts) and the rear pair of ground engaging members 44 for two-wheel or four-wheel drive operation of the vehicle 12. It will be appreciated that the preferred drive configuration between the driven clutch 30 and the rear pair of ground engaging members 44 is a common transaxle configuration. Alternatively, a separate rear drive case may extend from a transmission to drive the rear wheels.

FIG. 3 shows a left side view of the ATV of FIG. 2. As can be appreciated from this view, the CVT 26 is positioned rearward the motor M. Accordingly, the drive shaft 22 coupled to the drive clutch 28 is positioned rearward and spatially separate from the crankshaft 14.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle having a fore-and-aft axis and a side-to-side axis, the vehicle comprising:
    a motor having an output shaft;
    a CVT having a drive clutch secured to a drive shaft rotatably coupled to the motor output shaft via a drive mechanism extending transverse to the motor output shaft, the drive mechanism being a belt, chain, or shaft, the CVT drive shaft being longitudinally and/or vertically offset from the motor output shaft and substantially parallel to the motor output shaft;
    the CVT having a driven clutch coupled to the drive clutch, the driven clutch having a driven shaft offset from and substantially parallel to the motor output shaft, wherein the drive shaft and the driven shaft are disposed on a same fore or aft side of the motor output shaft; and
    an output member rotatably coupled to and driven by the CVT driven shaft, the output member driving a ground engaging member of the vehicle, the output member passing under the drive shaft.

2. The vehicle of claim 1, wherein the motor output shaft is oriented transverse to a longitudinal axis of the vehicle, the motor including a casing and the drive mechanism being secured to the motor output shaft external to said motor casing.

3. The vehicle of claim 2, further comprising a secondary drive mechanism rotatably coupled to the CVT drive shaft for providing motive power to at least one auxiliary device.

4. The vehicle of claim 1, wherein the drive mechanism comprises a drive belt, the motor output shaft having a motor pulley secured thereto, said motor pulley engaging the drive belt, further wherein the CVT drive shaft includes a drive pulley engaged with the drive belt.

5. The vehicle of claim 4, wherein the drive belt extends from an end of the motor output shaft at a lateral side of the motor, the belt extending in a fore-aft direction.

6. The vehicle of claim 1, wherein the motor output shaft has a longitudinal axis spatially forward of, a longitudinal axis of the CVT drive shaft.

7. The vehicle of claim 1, further comprising a stator coupled to the CVT drive shaft.

8. The vehicle of claim 1, further comprising a centrifugal clutch entrained between the motor output shaft and the CVT drive shaft.

9. The vehicle of claim 1, wherein the driven shaft is rotatably coupled to another output member for rotating a rear axle coupled to a rear pair of ground engaging members.

10. The vehicle of claim 1, further comprising a supplemental gear attached to the CVT drive shaft for powering at least one device attachable to the vehicle.

11. The vehicle of claim 1, wherein the motor is an internal combustion engine and the motor output shaft is a crankshaft.

12. The vehicle of claim 1, wherein the vehicle is an all-terrain vehicle with at least four wheels drivingly entrained with the CVT driven shaft.

13. A drive package for an all-terrain vehicle having at least one pair of ground engaging members, the drive package comprising:
    a motor having an output shaft, the motor output shaft having a lateral end extending from the motor;
    a coupling drive mechanism rotatably coupled to the lateral end of the motor output shaft and extending transverse to a longitudinal axis of the motor output shaft;
    a drive shaft of a CVT, the drive shaft rotatably coupled to the coupling drive mechanism, the CVT drive shaft being substantially parallel to the motor output shaft; and
    an output member rotatably coupled to and driven by a driven shaft of the CVT, the output member driving a ground engaging member of the vehicle, the output member passing under the drive shaft, wherein the drive shaft and the driven shaft are disposed on a same fore or aft side of the motor output shaft.

14. The drive package of claim 13, wherein coupling drive mechanism is a belt, a chain or a shaft.

15. The drive package of claim 13, further comprising a centrifugal clutch rotatably attached to the CVT drive shaft and entrained with the coupling drive mechanism.

16. The drive package of claim 13, wherein the coupling drive mechanism is a belt, each of the motor output shaft and the CVT drive shaft having a pulley thereon engaging the belt.

17. An all-terrain vehicle having a pair of front ground engaging members and a pair of rear ground engaging members, the all-terrain vehicle comprising:
    a motor having a crankshaft, the crankshaft having a lateral end extending from the motor;
    an auxiliary drive mechanism rotatably coupled to the lateral end of the crankshaft, the auxiliary drive mechanism being a belt, chain, or shaft extending transverse to a longitudinal axis of the crankshaft;
    a CVT having a drive shaft and a driven shaft, the drive shaft being rotatably coupled to the auxiliary drive mechanism; the drive shaft having a longitudinal axis offset from the longitudinal axis of the crankshaft, wherein the drive shaft and the driven shaft are disposed on a same fore or aft side of the crankshaft; and
    a drivetrain having an input coupled to the driven shaft, a first output shaft driven by the input and a second output shaft driven by the input, the first output shaft being coupled to the pair of front ground engaging members and the second output shaft being coupled to the pair of rear ground engaging members, wherein the first output shaft or the second output shaft passes under the drive shaft.

18. The all-terrain vehicle of claim 17, wherein one of the first output shaft or the second output shaft passes under both of the drive shaft and the motor, and the longitudinal axis of the crankshaft is substantially parallel to, and spatially forward of, the longitudinal axis of the drive shaft.

19. The all-terrain vehicle of claim 17, wherein the auxiliary drive mechanism is positioned external to the motor.

* * * * *